United States Patent
Kitagawa

(10) Patent No.: US 8,866,668 B2
(45) Date of Patent: Oct. 21, 2014

(54) RADAR APPARATUS WITH DIFFERENT OPERATION MODES

(71) Applicant: Denso Corporation, Kariya (JP)

(72) Inventor: Hideki Kitagawa, Aichi-ken (JP)

(73) Assignee: Denso Corporation, Kariya (JP)

( * ) Notice: Subject to any disclaimer, the term of this patent is extended or adjusted under 35 U.S.C. 154(b) by 193 days.

(21) Appl. No.: 13/663,700

(22) Filed: Oct. 30, 2012

(65) Prior Publication Data

US 2013/0106646 A1 May 2, 2013

(30) Foreign Application Priority Data

Nov. 2, 2011 (JP) ................................. 2011-241376

(51) Int. Cl.
| G01S 7/40 | (2006.01) |
| G01S 13/34 | (2006.01) |
| G01S 7/35 | (2006.01) |
| G01S 13/58 | (2006.01) |
| G01S 13/93 | (2006.01) |

(52) U.S. Cl.
CPC ............... G01S 7/354 (2013.01); G10S 13/931 (2013.01); G01S 13/345 (2013.01); G01S 13/584 (2013.01)
USPC .................. 342/173; 342/27; 342/70; 342/89; 342/90; 342/104; 342/107; 342/108; 342/109; 342/115; 342/118; 342/128; 342/159; 342/165; 342/175; 342/192; 342/195; 342/196

(58) Field of Classification Search
USPC ............... 342/27, 28, 70–72, 118, 128–133, 342/159–175, 192–197, 89–93, 104–115
See application file for complete search history.

(56) References Cited

U.S. PATENT DOCUMENTS

| 3,836,966 | A | * | 9/1974 | Frisbee, Jr. ...................... 342/91 |
| 3,992,709 | A | * | 11/1976 | Watanabe et al. ................ 342/70 |
| 6,097,331 | A | * | 8/2000 | Matsugatani et al. ........... 342/70 |
| 6,563,454 | B2 | * | 5/2003 | Akasu ............................ 342/130 |
| 6,593,874 | B2 | * | 7/2003 | Yamashita ..................... 342/118 |
| 6,674,395 | B2 | * | 1/2004 | Nakanishi et al. ............. 342/109 |
| 6,683,559 | B2 | * | 1/2004 | Matsui et al. .................. 342/159 |
| 6,686,870 | B2 | * | 2/2004 | Nishimura et al. ............. 342/70 |
| 6,707,416 | B2 | * | 3/2004 | Ishii et al. ........................ 342/70 |
| 6,753,805 | B2 | * | 6/2004 | Nakanishi et al. ............. 342/128 |

(Continued)

FOREIGN PATENT DOCUMENTS

| JP | 07-151852 | 6/1995 |
| JP | 10-253750 | 9/1998 |

(Continued)

*Primary Examiner* — Bernarr Gregory

(74) *Attorney, Agent, or Firm* — Harness, Dickey & Pierce, PLC

(57) ABSTRACT

In a radar apparatus, a peak extractor performs frequency analysis on a beat signal to obtain a frequency spectrum for each of first and second detection modes based on the beat signal for a corresponding one of the first and second detection modes. The peak extractor extracts a plurality of first peak-signal components from the frequency spectrum obtained for the first detection mode, and a plurality of second peak-signal components from the frequency spectrum obtained for the second detection mode. A determiner compares each of the plurality of first peak-signal components with a corresponding one of the plurality of second peak-signal components to deter mine whether a noise is included in the beat signal according to a result of the comparison.

14 Claims, 5 Drawing Sheets

(56) References Cited

U.S. PATENT DOCUMENTS

| | | | |
|---|---|---|---|
| 6,856,278 B2 * | 2/2005 | Nakanishi et al. | 342/128 |
| 7,339,518 B2 * | 3/2008 | Natsume et al. | 342/70 |
| 7,460,058 B2 * | 12/2008 | Nakanishi | 342/128 |
| 7,466,260 B2 * | 12/2008 | Ishii et al. | 342/70 |
| 8,125,375 B2 * | 2/2012 | Nakanishi | 342/159 |
| 8,223,067 B2 * | 7/2012 | Moulton et al. | 342/159 |
| 2008/0231496 A1 | 9/2008 | Sakamoto | |

FOREIGN PATENT DOCUMENTS

| | | |
|---|---|---|
| JP | 2003-161776 | 6/2003 |
| JP | 4356758 | 8/2009 |
| JP | 2009-222472 | 10/2009 |

\* cited by examiner

RADAR APPARATUS WITH DIFFERENT OPERATION MODES

CROSS REFERENCE TO RELATED APPLICATIONS

This application is based on and claims the benefit of priority from Japanese Patent Application 2011-241376 filed on Nov. 2, 2011, the disclosure of which is incorporated in its entirety by reference.

TECHNICAL FIELD

The present disclosure relates to radar apparatuses designed to transmit a frequency-modulated radio wave signal and receive a return signal, i.e. an echo signal, from a target based on the transmitted radio wave signal, thus detecting a target that has reflected the transmitted radio wave signal.

BACKGROUND

Recently, radar apparatuses are used as, for example, anti-collision devices for motor vehicles. FM-CW (Frequency-Modulated Continuous Wave) radar apparatuses have been known as such a radar apparatus. The FM-CW radar apparatuses are designed to use a frequency-modulated radio continuous wave signal (FM-CW wave signal) as a transmission signal.

As illustrated by a solid line in the graph (a) of FIG. 7, a typical FM-CW radar apparatus transmits, as a radar wave signal, a continuous-wave transmission signal Ss that is frequency modulated by a triangular signal to have a frequency that linearly varies up and down cyclically over time. The FM-CW radar apparatus also receives a return signal, i.e. an echo signal, as a received signal Sr; this echo signal has been generated based on reflection of the transmitted signal Ss from a target as the received signal Sr.

As illustrated by a dashed line in the graph (a) of FIG. 7, the received signal Sr is delayed with respect to the transmission signal Ss by time Tr; the time Tr is required for the radar wave signal to make a round trip between the radar and the target. That is, the delay time Tr depends on the distance between the radar and the target. In addition, the received signal Sr is shifted in frequency with respect to the transmission signal Ss; this frequency shift, referred to fd, represents the Doppler shift of the received signal Sr with respect to the transmitted signal Ss. The Doppler shift fd depends on the relative speed between the target and the radar.

Mixing the received signal Sr and the transmitted signal Ss together by a mixer generates a beat signal B that is comprised of frequency components of the difference between the received signal Sr and the transmission signal Ss (see the graph (b) of FIG. 7). A frequency of the beat signal B during the period which the frequency of the transmission signal Ss rises will be referred to as a frequency fb1 for up-modulation frequency, and a frequency of the beat signal B during the period which the frequency of the transmission signal Ss falls will be referred to as a frequency fb2 for down-modulation frequency. The period during which the frequency of the transmission signal Ss rises will be expressed as an up-modulation period, and the period during which the frequency of the transmitted signal Ss falls will be expressed as a down-modulation period.

Using the frequencies fb1 and fb2 for up-modulation and down-modulation allows a frequency fr based on the delay time Tr to be expressed by the following equation [1], and the Doppler shift fd to be expressed by the following equation [2]:

$$fr = \frac{fb1 + fb2}{2} \quad [1]$$

$$fd = \frac{fb1 - fb2}{2} \quad [2]$$

Using the frequencies fr and fd allows the distance R between the target and the radar and the relative speed V therebetween to be expressed by the following equations [3] and [4]:

$$R = \frac{c \cdot fr}{4 \cdot fm \cdot \Delta F} \quad [3]$$

$$V = \frac{c \cdot fd}{2 \cdot Fo} \quad [4]$$

where c represents the propagation speed of radio waves, fm represents a modulation frequency fm of the triangular signal, $\Delta F$ represents a variation in frequency of the transmission signal Ss, and Fo represents a center frequency of the transmitted signal Ss.

In order to identify the frequencies fb1 and fb2 for up-modulation and down-modulation, values of the beat signal B are sampled at a sampling frequency. Sampled values of the beat signal B during the up-modulation period are subject to a Fast Fourier Transform (FFT), so that frequency components of the beat signal B for up-modulation are obtained. Similarly, sampled values of the beat signal B during the down-modulation period are subject to a FFT, so that frequency components in strength of the beat signal B for down-modulation are obtained.

A peak frequency component in strength of the beat signal B during the up-modulation period is extracted, as the frequency fb1, from the frequency components in strength of the beat signal B for up-modulation. Similarly, a peak frequency component in strength of the beat signal B during the down-modulation period is extracted, as the frequency fb2, from the frequency components in strength of the beat signal B for down-modulation.

As is well known, the sampling frequency fs should be set to be twice or more the upper limit frequency of the beat signal B. That is, the variation in frequency of a frequency-modulated transmission signal Ss to be transmitted from the radar and a modulation period 1/fm of the triangular signal should be determined such that frequency components of beat signals B, which will be generated based on echo signals from any targets existing in a predetermined detection range of the radar, are within the effective frequency range defined for detection of the beat signals B; this effective frequency range is equal to or lower than the upper limit frequency.

There have been various approaches to eliminate noise converted by the mixer into frequency components within the effective frequency range defined for detection of the beat signals B, i.e. noises with their frequencies close to the frequency of a radar wave signal to be transmitted as a transmission signal. One example of these known noise-elimination approaches is disclosed in US Patent Application Publication No. 2008/0231496A1 corresponding to Japanese Patent Publication No. 4356758.

SUMMARY

Radio wave signals within a millimeter wave band, i.e. a gigahertz frequency band, are normally used as transmission signals for FW-CW radar apparatuses for vehicles. For this reason, one of these noise-elimination approaches is installed in the mixer, which is most effective in a transmitted signal with a frequency within a millimeter wave band inputted to the mixer. Thus, if noises have frequencies of, for example, the order of megahertz or higher, which are out of the millimeter wave band, that is, out of the effective frequency range, and are inputted to the mixer, the noise components may pass through the mixer with their frequencies unchanged but with their amplitudes attenuated, so that they may be superimposed on a beat signal.

In the FFT, the noise components superimposed on the beat signal may be sampled as they are if the frequencies of the noise components are lower than half of the sampling frequency fs, i.e. fs/2; this frequency fs/2 will be referred to as the Nyquist frequency. On the other hand, in the FFT, if the frequencies of the noises superimposed on the beat signal are higher than the Nyquist frequency fs/2, the noise components may be sampled and their frequencies appear to be shifted to the lower side of the Nyquist frequency fs/2, i.e. to be symmetric with respect to the Nyquist frequency fs/2.

These noise components may result in reduction in target detection accuracy of the FM-CW radar apparatus.

In view of the circumstances set forth above, one aspect of the present disclosure seeks to provide radar apparatuses, which are designed to address the problems set forth above.

Specifically, an alternative aspect of the present disclosure aims to provide such radar apparatuses capable of determining whether there are noise components in a beat signal, and eliminating adverse effects due to the noises.

According to a first exemplary aspect of the present disclosure, there is provided a radar apparatus. The radar apparatus includes a transceiver configured to operate successively in first and second detection modes to transmit a radio-wave signal having a frequency that changes at respective rates of change for the first and second detection modes and receive one or more radio signals based on the radio-wave signal as a received signal. The rate of change in the first detection mode is different from the rate of change in the second detection mode. The radar apparatus includes a beat-signal generator configured to generate a beat signal for each of the first and second detection modes according to the radio-wave signal and the received signal. The radar apparatus includes a peak extractor. The peak extractor is configured to perform a frequency analysis on the beat signal to obtain a frequency spectrum for each of the first and second detection modes based on the beat signal for a corresponding one of the first and second detection modes. The peak extractor is also configured to extract a plurality of first peak-signal components from the frequency spectrum obtained for the first detection mode, and a plurality of second peak-signal components from the frequency spectrum obtained for the second detection mode. Each of the plurality of first peak-signal components and the plurality of second peak-signal components has a local peak in intensity in the frequency spectrum for a corresponding one of the first and second detection modes. The radar apparatus includes a target information generator configured to generate information about a first target according to the plurality of first peak-signal components extracted by the peak extractor in the first detection mode, and generate information about a second target according to the plurality of second peak-signal components extracted by the peak extractor in the second detection mode. The radar apparatus includes a determiner configured to compare each of the plurality of first peak-signal components with a corresponding one of the plurality of second peak-signal components to determine whether a noise is included in the beat signal according to a result of the comparison.

Specifically, even if components of the received signal are within an effective frequency range of the beat signal generator, the signal components may pass through the beat signal generator with their frequencies unchanged, so that they may be superimposed on the beat signal as noises. In addition, if components of the received signal whose frequencies out of the effective frequency range of the beat signal generator are inputted to the beat signal generator together with the received signal, they may pass through the beat signal generator with their frequencies unchanged, so that they may be superimposed on the beat signal as noises.

These noises may appear as peak signal components in the frequency spectrum. The frequency of each of the first peak-signal components as noises in the first detection mode is identical to that of a corresponding one of the second peak-signal components as noises in the second detection mode. In addition, the other features of each of the first-peak signal components as noises in the first detection mode are similar to those of a corresponding one of the second peak-signal components as noises in the second detection mode.

Thus, the comparison between each of the plurality of first peak-signal components with a corresponding one of the plurality of second peak-signal components easily makes it possible to determine whether a noise is included in the beat signal.

If a noise is included in the beat signal, noise-derived peaks can be eliminated from the plurality of first and second peak-signal components. This results in an improvement of the reliability of targets detected by the radar apparatus.

According to a second exemplary aspect of the present disclosure, there is provided a radar apparatus. The radar apparatus includes a transceiver configured to operate in a normal detection mode to transmit a radio-wave signal having a frequency that changes at a rate of change and receive one or more return signals based on the radio-wave signal as a received signal, and operate in a noise detection mode to receive one or more return signals as a received signal. The radar apparatus includes a beat-signal generator configured to generate a beat signal according to the radio-wave signal and the received signal for the no mal detection mode and a beat signal according to the received signal for the noise detection mode. The radar apparatus includes a peak extractor. The peak extractor is configured to perform frequency analysis on the beat signal for each of the normal detection mode and the noise detection mode to obtain a frequency spectrum based on the beat signal for a corresponding one of the normal detection mode and the noise detection mode. The peak extractor is also configured to extract a plurality of first peak-signal components from the frequency spectrum obtained for the normal detection mode, and a plurality of second peak-signal components from the frequency spectrum obtained for the noise detection mode. Each of the plurality of first peak-signal components and the plurality of second peak-signal components has a local peak in intensity in the frequency spectrum for a corresponding one of the normal detection mode and the noise detection mode. The radar apparatus includes a target information generator configured to generate information about a target according to the plurality of first peak-signal components extracted by the peak extractor in the normal detection mode. The radar apparatus includes a determiner configured to compare each of the plurality of first peak-signal components with a corresponding one of the plurality of second peak-signal components to determine whether a noise is included in the beat signal for the normal detection mode according to a result of the comparison.

Specifically, even if components of the received signal are within an effective frequency range of the beat signal generator, the signal components may pass through the beat signal generator with their frequencies unchanged, so that they may be superimposed on the beat signal as noises. In addition, if components of the received signal whose frequencies out of the effective frequency range of the beat signal generator are inputted to the beat signal generator together with the received signal, they may pass through the beat signal generator with their frequencies unchanged, so that they may be superimposed on the beat signal as noises.

These noises may appear as peak signal components in the frequency spectrum. The frequency of each of the peak signal components as noises in the normal detection mode is identical to that of a corresponding one of the peak signal components as noises in the noise detection mode. In addition, the other features of each of the peak signal components as noises in the normal detection mode are similar to those of a corresponding one of the peak signal components as noises in the noise detection mode.

Thus, the comparison between each of the plurality of first peak-signal components with a corresponding one of the plurality of second peak-signal components easily makes it possible to determine whether a noise is included in the beat signal.

If a noise is included in the beat signal, noise-derived peaks can be eliminated from the plurality of first peak-signal components. This results in an improvement of the reliability of targets detected by the radar apparatus.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
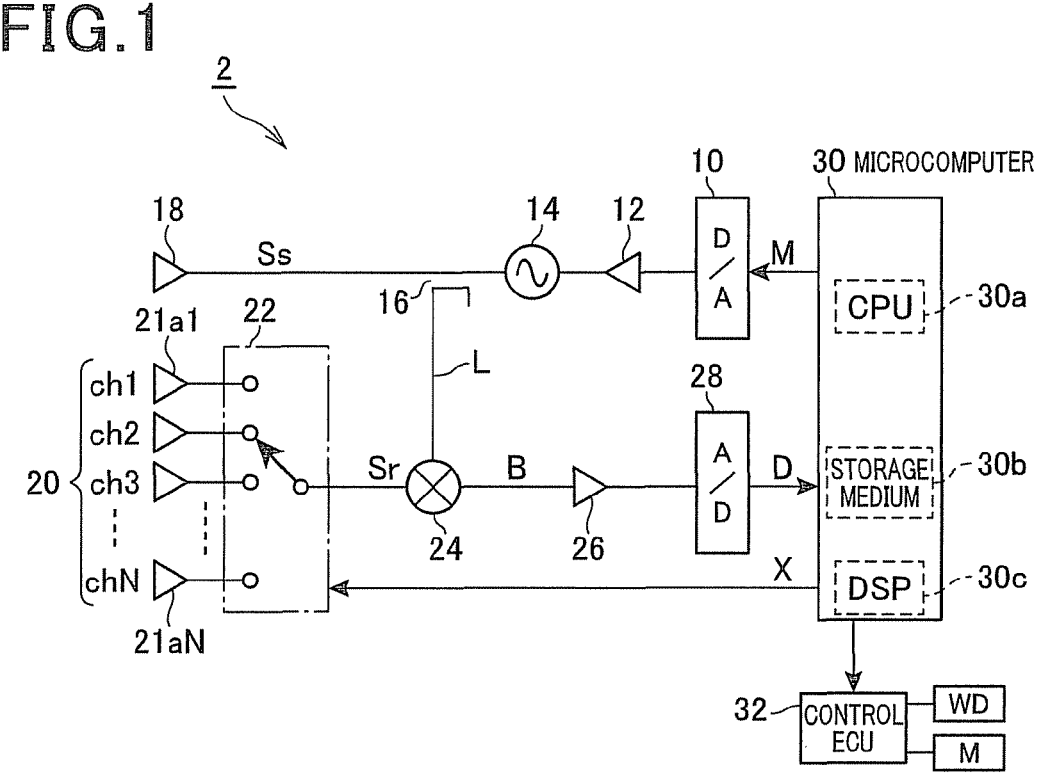
FIG. 1 is a block and circuit diagram schematically illustrating a radar apparatus according to a first embodiment of the present disclosure.

Embodiments of the present disclosure will be described hereinafter with reference to the accompanying drawings. In the embodiments, like parts between the embodiments, to which like reference characters are assigned, are omitted or simplified in redundant description.

First Embodiment

An example of the overall structure of a radar apparatus 2 according to the first embodiment is illustrated in FIG. 1. Referring to FIG. 1, the radar apparatus 2 is installed in a vehicle V and operative to perform driving-support tasks while a driver is driving the vehicle V.

Specifically, the radar apparatus 2 includes a D/A (Digital-to-Analog) converter 10, a buffer 12, a voltage-controlled oscillator (VCO) 14, a distributor. 16, and a transmitting antenna 18. The radar apparatus 2 also includes a receiving antenna module (an antenna array) 20, a receiving switch 22, a mixer 24, an amplifier 26, an A/D (Analog-to-Digital) converter 28, a microcomputer 30, and a control ECU 32. The control ECU 32 can be omitted from the radar apparatus 2.

The D/A converter 10 is operative to convert modulation data M into a triangular modulation voltage signal. The triangular modulation voltage signal is stored in the buffer 12.

The VCO 14 is operative to generate a high-frequency continuous-wave signal with its frequency varying according to the triangular modulation voltage signal applied thereto via the buffer 12. For example, in this embodiment, a millimeter continuous-wave signal is used as the high-frequency continuous-wave signal. The high-frequency continuous-wave signal is frequency modulated to have a frequency that linearly varies up and down cyclically over time. That is, the high-frequency continuous-wave signal is designed as a positively and negatively chirped signal.

The distributor 16 is operative to distribute in power the high-frequency continuous-wave signal outputted from the VCO 14 into a positively and negatively chirped transmission signal Ss and a local signal L.

The transmitting antenna 18 is operative to transmit the transmission signal Ss sent from the VCO 14 as a radio continuous-wave signal that is positively and negatively chirped.

The receiving antenna module 20 is comprised of N antennas 21a1 to 21aN (N is an integer equal to or greater than 2). The antennas 21a1 to 21aN are aligned in a row that is, for example, parallel to the width (horizontal) direction of the vehicle V. Channels ch1 to chN are allocated to the antennas 21a1 to 21aN, respectively.

The receiving switch 22 is operative to successively select one of the antennas 21a1 to 21aN (channels ch1 to chN) from, for example, the first channel ch1 to the N-th channel chN according to a timing signal X supplied from the microcomputer 30 to successively supply, to the mixer 24, received signals Sr sent from the respective selected channels ch1 to chN. These received signals Sr are generated based on arrival echo signals received by the respective selected channels ch1 to chN. That is, the receiving switch 22 is operative to shift a receiving channel to be selected according to the timing signal X supplied from the microcomputer 30.

The mixer 24 is operative to mix a received signal Sr corresponding to a selected channel with the distributed local signal L to produce a beat signal B; the beat signal B is comprised of a frequency component equivalent to the difference in frequency between the amplified received signal Sr corresponding to a selected channel and the local signal L.

The amplifier 26 is operative to amplify the beat signal B produced by the mixer 24.

The A/D converter 28 is operative to sample values of the beat signal B amplified by the amplifier 26 to convert them into digital sampled data (digital sampled values) D according to the timing signal X, and output the digital sampled data D to the microcomputer 30. Note that the A/D converter 28 can be installed in the microcomputer 30.

The microcomputer 30 is operative to receive the digital sampled data D for each channel, and perform signal processing based on the digital sampled data D for each channel, thus obtaining information associated with at least one target that has reflected the radio continuous-wave signal transmitted from the transmitting antenna 18. The information associated with the at least one target includes the distance and relative speed between the radar apparatus 2 and the at least one target, and the azimuth of the at least one target in, for example, the width direction of the vehicle V. The information associated with at least one target that has reflected the radio continuous-wave signal transmitted from the transmitting antenna 18 will be referred to as "target information".

The control ECU 32 is operative to perform, based on the target information supplied from the microcomputer 30, driving-support tasks for supporting a driver of the vehicle V while the driver is driving the vehicle V. The driving-support tasks according to this embodiment include, for example, an adaptive cruise control task and a precrash task.

The adaptive cruise control task automatically controls the speed of the vehicle V to keep the distance between the vehicle V and a forward vehicle ahead of the vehicle V to a target distance; the target distance can be set by the driver using, for example, a target distance setting switch (not shown).

The precrash task controls a warning device WD and a monitor M installed in the vehicle V to provide audible and/or visible warning to the driver of the vehicle V, controls the brakes of the vehicle V to apply full braking to the vehicle V, and/or tightens the seatbelts when the distance between the vehicle V and a forward vehicle ahead of the vehicle V is equal to or lower than a preset threshold distance.

Particularly, the VCO 14 generates the high-frequency continuous-wave signal having a given center frequency Fo and a given fluctuation range $\Delta F$. For example, the center frequency Fo is set to 76.5 GHz, and the fluctuation range $\Delta F$ is set to 100 MHz at the maximum.

Note that an angular range, in which a decrease in gain of a beam formed by an antenna from the central direction of the front surface (beam emitting surface) of the antenna is within 3 dB, is defined as a beam width. At that time, each antenna of the receiving antenna module 20 has a beam width set to cover the whole beam width of the transmitting antenna 18.

The timing signal X is a train of pulses with time intervals Tp. For example, the time interval Tp is set to 200 ns. The receiving switch 22 successively changes selection of the receiving channels ch1 to chN in the order from the first channel ch1 to the last channel chN each time a pulse of the timing signal X is inputted to the receiving switch 22. Note that the microcomputer 30 is adapted to cyclically generate the timing signal X, thus repeating a cycle of the successive selections of all the receiving channels ch1 to chN.

The A/D converter 28 operates in accordance with each pulse of the timing signal X to convert the received level of a beat signal B of a corresponding channel chk immediately before the selection of a beat signal B corresponding to the next channel chk+1 into a digital sampled value of digital sampled data D.

That is the A/D converter 28 successively samples the beat signals B from the first channel ch1 to the N-th channel chN at the time intervals Tp, and cyclically repeats the successive samples of the beat signals B from the first channel ch1 to the N-th channel chN. For this reason, a beat signal B for one channel chi is sampled at a sampling frequency fs that is expressed by the following equation "$fs=1/(N \times Tp)$".

Note that the time interval Tp can be set to be equal to or longer than one of: a predetermined shortest selection period for the switching elements 20a1 to 20aN, and a predetermined shortest conversion period of the A/D converter 28.

The shortest selection period for the switching elements 20a1 to 20aN is defined as the shortest period between selection of one of the switching elements 20a1 to 20aN to selection of the next switching element as long as the operation of the receiving switch 22 is guaranteed.

The shortest conversion period of the A/D converter 28 is defined as the shortest period between conversion of the received level of a beat signal B of a corresponding channel and conversion of the received level of a beat signal B of the next channel as long as the operation of the A/D converter 28 is guaranteed.

The mixer 24 has a predetermined frequency range centered around the center frequency fo and having ± several GHz from the center frequency fo. The frequency range serves as an effective frequency range that enables the mixer 24 to convert input signals, i.e. a received signal Sr and the local signal L, into a beat signal B based on the difference in frequency between both the input signals only when the input signals are within the effective frequency range. Note that the mixer 24 is configured to pass therethrough either a part of an input signal within the effective frequency range or an input signal out of the effective frequency range as it is although it may be attenuated.

For example, the microcomputer 30 is comprised of a normal microcomputer consisting essentially of a CPU 30a, a storage medium 30b, and a processor, such as a DSP (Digital Signal Processor) 30c for performing digital signal processing, such as frequency analysis including FFT (Fast Fourier transform). The microcomputer 30 is communicably connected to the receiving switch 22, the A/D converter 28, and the control ECU 32.

The CPU 30a of the microcomputer 30 is programmed to perform at least an operation control routine and a target detection routine. The operation control routine is designed to generate the modulation data M and the timing signal X for control of each component of the radar apparatus 2. The target detection routine is designed to obtain the target information of at least one target that has reflected a radio continuous-wave signal transmitted from the transmitting antenna 18.

First, the operation control routine executed by the CPU 30a will be described in detail hereinafter. The operation control routine is programmed to be cyclically launched while the radar apparatus 2 is being powered.

When launched, the operation control routine is programmed to operate the radar apparatus 2 in two different operation modes, and sample a beat signal B obtained by each channel to generate sampled values of the beat signal B for each channel.

The two different operation modes are a far-field detection mode and a near-field detection mode. The far-field detection mode is designed to mainly detect relatively long-distance targets with respect to the radar apparatus 2, such as targets each located at a distance equal to or longer than 5 m with respect to the radar apparatus 2. The near-field detection mode is designed to mainly detect relatively short-distance targets with respect to the radar apparatus 2, such as targets each located at a distance shorter than 5 m.

Figure 2:
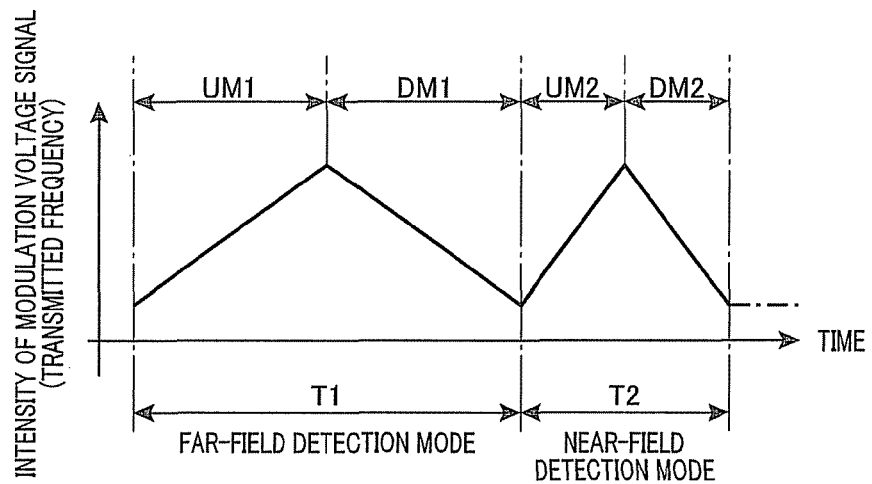
FIG. 2 is a view schematically illustrating how an operation control routine is carried out by a microcomputer illustrated in FIG. 1 according to the first embodiment.

FIG. 2 schematically illustrates the order of execution of the far-field detection mode and the near-field detection mode during one cycle of the operation control routine, and the waveform of the triangular modulation voltage signal used for each of the far-field detection mode and the near-field detection mode. The waveform of the triangular modulation voltage signal used for each of the far-field detection mode and the near-field detection mode shows how the frequency of the continuous-wave transmission signal Ss transmitted from the transmitting antenna 18 for each of the far-field detection mode and the near-field detection mode is changed.

Referring to FIG. 2, the CPU 30*a* executes the operation control routine to operate the radar apparatus 2 in the order of the far-field detection mode and the near-field mode each time the operation control routine is launched. Reference character T1 represents a period during which the radar apparatus 2 is operating in the far-field direction mode, and reference character T2 represents a period during which the radar apparatus 2 is operating in the near-field detection mode. The order of the far-field detection mode and the near-field mode can be reversed. The sum of the period T1 in the far-field mode and the period T2 in the near-field mode represents one cycle of the operation control routine of the radar apparatus 2.

FIG. 2 shows that the gradient, i.e. the rate of change, of the triangular modulation voltage signal over time during the near-field execution mode is different from that of the triangular modulation voltage signal over time, i.e. greater than that of the triangular modulation voltage signal over time.

That is, the operation control routine is programmed to output, to the D/A converter 10, the modulation data D designed for D/A converter 10 to generate the triangular modulation voltage signal illustrated in FIG. 2. The operation control routine is also programmed to continuously output the train of pulses with the time intervals Tp as the timing signal X during each of the periods T1 and T2.

In this embodiment, the period T1 is set to the time length required to obtain 2-by-Nf digital sampled values D for each channel; the Nf represents the number of digital sampled values for each of an up-modulation period UM1 and a down-modulation period DM1 in the far-field detection mode, such as Nf=250. The up-modulation period UM1 is a period during which the frequency of the transmission signal Ss rises for up-modulation in the far-field detection mode, and the down-modulation period DM1 is a period during which the frequency of the transmission signal Ss falls for down-modulation in the far-field detection mode. That is, the period T1 is expressed by the equation: $T1 = N \times 2Nf \times Tp$.

In contrast, the period T2 is set to the time length required to obtain 2-by-Ne digital sampled values D for each channel; the Ne represents the number of digital sampled values for each of an up-modulation period UM2 and a down-modulation period DM2 in the near-field detection mode, such as Ne=128. The up-modulation period UM2 is a period during which the frequency of the transmission signal Ss rises for up-modulation in the near-field detection mode, and the down-modulation period DM2 is a period during which the frequency of the transmission signal Ss falls for down modulation in the near-field detection mode. That is, the period T2 is expressed by the equation: $T2 = N \times 2Ne \times Tp$.

Based on the operation control routine, a high-frequency continuous-wave signal generated by the VCO 14 is distributed by the distributor 16, so that the transmission signal Ss and the local signal L are generated. The transmission signal Ss is transmitted from the transmission antenna 18 as a radio continuous-wave signal that is positively and negatively chirped toward.

One or more echo signals, i.e. radio-wave return signals, reflected by one or more targets based on the transmitted radio continuous-wave signal are returned to the radar device 2, and received by each of the antennas (channels) ch1 to chN as a received signal Sr. A received signal Sr outputted from a channel chi (i=1, 2, . . . , or N) currently selected by the receiving switch 22 is supplied to the mixer 24.

At the mixer 24, the received signal Sr is mixed with the local signal L, so that a beat signal B corresponding to the selected channel chi is produced. The beat signal B, which has been amplified by the amplifier 26, is sampled by the A/D converter 28 according to the timing signal X as digital sampled data (digital sampled values), and thereafter, the sampled data is captured by the microcomputer 30.

As a result, Nf digital sampled values D for each of the channels ch1 to chN are captured for each of the up-modulation period UM1 and the down modulation period DM1 during the period T1 of the far-field detection mode. Nf digital sampled values D for all the channels ch1 to chN during the period T1 of the far-field detection mode will be referred to as "far-field sampled values Df" hereinafter. In addition, Ne digital sampled values D for each of the channels ch1 to chN are captured for each of the up-modulation period UM1 and the down-modulation period DM1 during the period T2 of the near-field detection mode. Ne digital sampled values D for all the channels ch1 to chN during the period T2 of the near-field detection mode will be referred to as "near-field sampled values Dn" hereinafter.

Note that, even if components of a received signal Sr are within the effective frequency range of the mixer 24, the signal components may pass through the mixer 24 with their amplitudes attenuated, so that they may be superimposed on a corresponding beat signal B as noises. In addition, if components of a received signal Sr whose frequencies out of the effective frequency range of the mixer 24 are inputted to the mixer 24 together with a received signal Sr, they may pass through the mixer 24 with their frequencies unchanged but with their amplitudes attenuated, so that they may be superimposed on a corresponding beat signal B as noises.

Thus, components of a received signal Sr, which are within the same frequency band as beat signals, may be superimposed on a corresponding beat signal.

Next, the target detection routine executed by the CPU 30*a* will be described in detail hereinafter. The target detection routine is programmed to be launched when the radar apparatus 2 is powered up.

When launched, the CPU 30*a* determines whether acquisition of far-field sampled values Df while the radar apparatus 2 is operating in the far-field detection mode has been completed in step S110. When determining that acquisition of far-field sampled values Df has not been completed (NO in step S110), the CPU 30*a* repeats the determination in step S110.

Otherwise, when determining that acquisition of far-field sampled values Df has been completed (YES in step S110), the CPU 30*a* carries out signal processing on the acquired far-field sampled values Df during each of the up-modulation period UM1 and the down-modulation period DM1 in step S120.

The signal processing carried out in step S120 will be described in detail hereinafter.

The CPU 30*a* separates the far-field digital sampled values Df of the beat signals B of all the channels ch1 to chN into digital sampled values of the beat signal B of each of the channels ch1 to chN. Hereinafter, beat signals B of the channels ch1 to chN will be referred to as "beat signals B1 to BN".

Next, the CPU 30*a* performs an FFT on each of the sampled digital values of each of the beat signals B1 to BN during the up- and down-modulation periods UM1 and DM1 to obtain a frequency spectrum, i.e. power spectrum, of each of the beat signals B1 to BN during the up- and down-modulation periods UM1 and DM1. The power spectrum of a beat signal Bi demonstrates intensity levels of frequency components of the beat signal Bi.

Based on the intensity levels of the frequency components of the beat signals B1 to BN, the CPU 30*a* extracts frequency components $fbu_1$ to $fbu_m$ in all the frequency components of each of the beat signals B1 to BN within the up-modulation period UM1; each of the extracted frequency components $fbu_1$ to $fbu_m$ has a local peak in intensity. Similarly, based on the intensity levels of the frequency components of each of the beat signals B1 to BN, the CPU 30*a* extracts frequency components $fbd_1$ to $fbd_m$ in all the frequency components of the beat signals B1 to BN within the down-modulation period DM1; each of the extracted frequency components $fbd_1$ to $fbd_m$ has a local peak in intensity. The extracted frequency components within the up-modulation period UM1 will be referred to as up-modulation frequency bins, and the extracted frequency components within the down-modulation period DM1 will be referred to as down-modulation frequency bins.

For example, in step S120*b*, the CPU 30*a* calculates an averaged frequency spectrum based on the intensity levels of all the frequency components of the beat signals B1 to BN. Then, the CPU 30*a* extracts, from the averaged frequency spectrum, frequency components each having an intensity level greater than a preset threshold in the up-modulation period UM1 as up-modulation frequency bins in step S120*b*. Similarly, the CPU 30*a* extracts, from the averaged frequency spectrum, frequency components each having an intensity level greater than a preset threshold in the down-modulation period DM1 as down-modulation frequency bins in step S120*b*.

Note that signal components in the beat signals B1 to BN, each of which has a local peak in intensity at a corresponding one of the up-modulation frequency bins during the up-modulation period UM1 or at a corresponding one of the down-modulation frequency bins during down-modulation period DM1 will be referred to as "peak signal components" hereinafter.

Next, the CPU 30*a* performs an FFT on each of the peak signal components during the up-modulation period UM1, and an FFT on each of the peak signal components during the down-modulation period DM1 in step S120*c*.

For example, in step S120*c*, the CPU 30*a* performs an FFT on the phase differences between the peak signal components during the up-modulation period UM1 and a reference phase to analyze intensity levels of frequency components of the phase differences between each of the peak signal components during the up-modulation period UM1 and the reference phase. Similarly, the CPU 30*a* performs an FFT on the phase differences between each of the peak signal components during the down-modulation period DM1 and a reference phase to analyze intensity levels of frequency components of the phase differences between each of the peak signal components during the down-modulation period DM1 and the reference phase.

Based on the intensity levels of the frequency components of the phase differences between each of the peak signal components during the up-modulation period UM1 and the reference phase, the CPU 30*a* extracts a frequency component in all the frequency components of the phase differences between each of the peak signal components during the up-modulation period UM1 and the reference phase; the extracted frequency component has a local peak in intensity in step S120*c*.

Similarly, based on the intensity levels of the frequency components of the phase differences between each of the peak signal components during the down-modulation period DM1 and the reference phase, the CPU 30*a* extracts a frequency component in all the frequency components of the phase differences between each of the peak signal components during the down-modulation period DM1 and the reference phase; the extracted frequency component has a local peak in intensity in step S120*c*.

At that time, the extracted frequency component with a local peak during the up-modulation period UM1 represents the arrival azimuth of at least one echo signal corresponding to the extracted frequency component in the vehicle width direction during the up-modulation period UM1. Similarly, the extracted frequency component with a local peak during the down-modulation period DM1 represents the arrival azimuth of at least one echo signal corresponding to the extracted frequency component in the vehicle width direction during the down-modulation period DM1.

That is, the signal processing in step S120 obtains, for each of the peak signal components, i.e. each of the up-modulation frequency bins, during the up-modulation period UM1, the frequency, the intensity level, and the arrival azimuth of at least one echo signal that produces the corresponding peak signal component. Similarly, the signal processing in step S120 obtains, for each of the peak signal components, i.e. each of the down-modulation frequency bins, during the down-modulation period DM1, the frequency, the intensity level, and the arrival azimuth of at least one echo signal that produces the corresponding peak signal component.

Hereinafter, the peak signal components during the up-modulation period UM1 in the far-field detection mode will be referred to as far-field up-modulation peaks, and the peak signal components during the down-modulation period DM1 in the far-field detection mode will be referred to as far-field down-modulation peaks. The far-field up-modulation peaks and the far-field down-modulation peaks will be collectively referred to as far-field peaks.

Note that components of a beat signal B with their frequencies equal to or lower than half of the sampling frequency $fs=1/(N \times Tp)$ are detected as they are; the half of the sampling frequency fs will be referred to as an upper limit frequency of a detectable beat signal B, briefly as an upper limit frequency. In contrast, components of a beat signal B with their frequencies higher than the upper limit frequency are shifted to the lower side of the upper limit frequency to be symmetrical with the upper limit frequency as aliasing.

After the signal processing in step S120 in the far-field detection mode, the CPU 30*a* determines whether acquisition of near-field sampled values Dn while the radar apparatus 2 is operating in the near-field detection mode has been completed in step S130. When determining that acquisition of near-field sampled values Dn has not been completed (NO in step S130), the CPU 30*a* repeats the determination in step S130. Otherwise, when determining that acquisition of near-field sampled values Dn has been completed (YES in step S130), the CPU 30a carries out signal processing on the acquired near-field sampled values Dn during each of the up-modulation period UM2 and the down-modulation period DM2 in step S140.

The signal processing carried out in step S140 is identical to that carried out in step S120 except wherein the up-modulation period UM1 and the down-modulation period DM1 are replaced with the up-modulation period UM2 and the down-modulation period DM2.

That is, the signal processing in step S140 obtains, for each of the peak signal components during the up-modulation period UM2, the frequency, the intensity level, and the arrival azimuth of at least one echo signal that produces the corresponding peak signal component. Similarly, the signal processing in step S140 obtains, for each of the peak signal components during the down-modulation period DM2, the frequency, the intensity level, and the arrival azimuth of at least one echo signal that produces the corresponding peak signal component.

Hereinafter, the peak signal components during the up-modulation period UM2 in the near-field detection mode will be referred to as near-field up-modulation peak, and the peak signal components during the down-modulation period DM2 in the near-field detection mode will be referred to as near-field down-modulation peak. The near-field up-modulation peak and the near-field down-modulation peak will be collectively referred to as near-field peaks.

After the signal processing in step S140 in the near-field detection mode, the CPU 30a carries out a noise-derived peak extraction task in step S150. The noise-derived peak extraction task is to extract at least one peak signal component, which is estimated to be derived from a noise, in the peak signal components extracted in steps S120 and S140.

The noise-derived peak extraction task is programmed to determine whether a predetermined condition is met between the far-field peaks and the near-field peaks in step S150. The predetermined condition is that the frequency, the intensity level, and the arrival azimuth of a corresponding echo signal of at least one of the far-field peaks (the far-field up-modulation peaks and the far-field down-modulation peaks) are matched with those of a corresponding one of the near-field peaks (the near-field up-modulation peaks and the near-field down-modulation peaks), respectively.

Note that, in this embodiment, the fact that a first physical parameter is matched with a second physical parameter means that the difference between a value of the first physical parameter and that of the second physical parameter is within a predetermined allowable range.

Thus, if the differences between the frequency, the intensity level, and the arrival azimuth of a corresponding echo signal of a far-field peak and those of a near-field peak are each within the predetermined allowable range, it is determined that the far-field peak is matched with the near-field peak.

Specifically, in step S150a, the CPU 30a compares each of the far-field peaks with a corresponding one of the near-field peaks. Then, the CPU 30a determines whether the predetermined condition is met between at least one of the far-field peaks and a corresponding at least one of the near-field peaks according to the results of the comparison in step S150b.

When determining that the predetermined condition is not met between each of the far-field peaks and a corresponding one of the near-field peaks (NO in step S150b), the CPU 30a determines that there are no noise-derived peaks, i.e. peak signal components estimated to be derived from noises, in the far-field peaks and near-field peaks extracted in steps S120 and S140 (NO in step S160).

Then, in step S180, the CPU 30a carries out a target detecting task using the peak signal components extracted in steps S120 and S140, and, in step S190, carries out a target-information output task that outputs information about at least one target extracted by the target detecting task carried out in step S180. Thereafter, the execution point of the CPU 30a returns to step S110, so that the CPU 30a repeatedly carries out the operations in steps S110 to S190.

The target detecting task is carried out for each of the far-field peaks and the near-field peaks.

First, the target detecting task is carried out for the far-field peaks will be described hereinafter.

For example, the target detecting task in step S180 is programmed to perform a known "pair-matching" task to extract, from the up-modulation far-field peaks and the down-modulation far-field peaks, pairs of far-field up-modulation peaks in the up-modulation period UM1 and far-field down-modulation peaks in the down-modulation period DM1 in step S180a; the far-field up-modulation peak and the far-field down-modulation peak of each pair meet the following conditions:

The first condition is that the difference in direction between the arrival echo signals corresponding to the far-field up-modulation peak and the far-field down-modulation peak of each pair is within a predetermined angular range. The second condition is that the difference in intensity between the arrival echo signals corresponding to the far-field up-modulation peak and the far-field down-modulation peak of each pair is within a predetermined range. That is, the CPU 30a estimates that each of the pairs of far-field up-modulation peaks and far-field down-modulation peaks extracted in step S180a corresponds to a same target that has reflected the radio continuous-wave signal transmitted from the radar apparatus 2. The pairs of far-field up-modulation and down-modulation peaks will be referred to as "far-field peak pairs" hereinafter.

Note that, as described above, the operation control routine is cyclically carried out by the CPU 30a. Thus, the far-field pairs are obtained by the CPU 30a in step 180a every cycle, i.e. the period T1 illustrated in FIG. 2, of the operation control routine. Thus, when the far-field pairs are obtained by the CPU 30a during a current cycle of the operation control routine, the far-field pairs have been obtained during the previous cycle of the operation control routine. The far-field pairs obtained during a current cycle of the operation control routine will be referred to as current far-field pairs, and the far-field pairs obtained in the previous cycle of the operation control routine will be referred to as previous far-field pairs.

Specifically, the CPU 30a performs a historical tracking task based on correlations between each of the current far-field pairs and a corresponding one of the previous far-field pairs to generate a plurality of segments in each of which a current far-field pair and a corresponding previous far-field pair, which show the track of the same target, are included in step S180b.

Then, the CPU 30a generates target information about a detected target for each of the plurality of segments according to results of the historical tracking task, i.e. the current far-field pair and the previous far-field pair included in the corresponding segment in step S180c. The target information in this embodiment includes at least the distance from the radar apparatus 2 to a detected target, the relative speed between the radar apparatus 2 and the detected target, and the azimuth of the detected target with respect to a reference axis, such as an axis orthogonal to the receiving surface of the radar apparatus 2 in the width direction of the vehicle. Thereafter, the CPU 30a outputs the target information about the detected target for each of the plurality of segments to, for example, the control ECU 32.

The operations in steps S180a to 180c are similarly carried out for the near-field peaks except wherein "far-field" is replaced with "near-field".

Otherwise, when determining that the predetermined condition is met between one of the far-field peaks and a corresponding one of the near-field peaks (YES in step S150b), the CPU 30a determines that there are noise-derived peaks, i.e. peak signal components estimated to be derived from noises, in the far-field peaks and the near-field peaks extracted in steps S120 and S140 (YES in step S160). That is, the one of the far-field peaks and the corresponding one of the near-field peaks are determined as noise-derived peaks in the far-field peaks and the near-field peaks extracted in steps S120 and S140.

Then, the CPU 30a carries out a noise-derived peak elimination task in step S170. Specifically, in step S170a, the CPU 30a serves as a noise eliminator to eliminate the noise-derived peaks from the far-field peaks and the near-field peaks extracted in steps S120 and S140. This removes the noise-derived peaks from the far-field peaks and the near-field peaks extracted in steps S120 and S140, on which the target detecting task will be carried out in step S180.

Then, the CPU 30a serves as an information providing unit that generates information representing that there are some abnormalities in radio environments around the vehicle, and instructs the control ECU 32 to provide the information as audible and/or visible information to the driver of the vehicle V via the warning device WD and the monitor M installed in the vehicle V in step S170b.

Following the noise-derived peak elimination task in step S170, the CPU 30a carries out the target detecting task in step S180 from which the noise-derived peaks have been eliminated.

As described above, the radar apparatus 2 according to this embodiment is configured to extract far-field peaks, i.e. peak signal components during the up- and down-modulation periods UM1 and DM1 in the far-field detection mode based on the results of an FFT, and extract near-field peaks, i.e. peak signal components during the up- and down-modulation periods UM2 and DM2 in the near-field detection mode based on the results of the FFT. Then, the radar apparatus 2 is configured to compare each of the far-field peaks with a corresponding one of the near-field peaks to determine whether there are noise-derived peaks in the far-field peaks and the near-field peaks according to the results of the comparison.

Specifically, even if components of a received signal Sr are within the effective frequency range of the mixer 24, the signal components may pass through the mixer 24 with their frequencies unchanged but with their amplitudes attenuated, so that they may be superimposed on a corresponding beat signal B as noises. In addition, if components of a received signal Sr whose frequencies out of the effective frequency range of the mixer 24 are inputted to the mixer 24 together with a received signal Sr, they may pass through the mixer 24 with their frequencies unchanged but with their amplitudes attenuated, so that they may be superimposed on a corresponding beat signal B as noises.

These noises may appear as peak signal components in the averaged frequency spectrum based on the intensity levels of all the frequency components of the beat signals B1 to BN in the far-field detection mode, and, similarly, they may appear as peak signal components in the averaged frequency spectrum based on the intensity levels of all the frequency components of the beat signals B1 to BN in the near-field detection mode. The frequency of each of the peak signal components as noises in the far-field detection mode is identical to that of a corresponding one of the peak signal components as noises in the near-field detection mode. In addition, the other features of each of the peak signal components as noises in the far-field detection mode are similar to those of a corresponding one of the peak signal components as noises in the near-field detection mode.

Thus, the comparison between each of the far-field peaks in the far-field detection mode with a corresponding one of the near-field peaks in the near-field detection mode easily makes it possible to determine whether there are noise-derived peaks in the far-field peaks and the near-field peaks.

If there are noise-derived peaks in the far-field peaks and the near-field peaks, the radar apparatus 2 is configured to eliminate the noise-derived peaks from the far-field peaks and the near-field peaks, on which the target detecting task will be carried out. This results in an improvement of the reliability of targets detected by the radar apparatus 2.

Note that, in the first embodiment, the VCO 14, the transmitting antenna 18, and the receiving antenna module 20 serve as, for example, a transceiver according to the first exemplary aspect of the present disclosure. The receiving switch 22 and the mixer 24 serve as, for example, a beat signal generator according to the first exemplary aspect of the present disclosure. The microcomputer 30, particularly, its operations in steps S120 and S140 serves as, for example, a peak extractor according to the first exemplary aspect of the present disclosure. The microcomputer 30, particularly, its operation in step S180 serves as, for example, a target information generator, and the microcomputer 30, particularly, its operations in steps S150 and S160 serves as, for example, a determiner according to the first exemplary aspect of the present disclosure.

Second Embodiment

A radar apparatus according to the second embodiment will be described with reference to FIGS. 4 and 5.

The structure and/or functions of the radar apparatus according to the second embodiment are mainly identical to those of the radar apparatus 2 according to the first embodiment except for the following points. So, the different points will be mainly described hereinafter.

Specifically, the operation control routine and a part of the target detecting routine carried out by the CPU 30a are partly different from those according to the first embodiment.

First, the operation control routine executed by the CPU 30a according to this embodiment will be described in detail hereinafter. The operation control routine is programmed to be cyclically launched while the radar apparatus 2 is being powered.

When launched, the operation control routine is programmed to operate the radar apparatus 2 in three different operation modes, and sample a beat signal B obtained by each channel to generate sampled values of the beat signal B for each channel.

The three different operation modes include a noise detection mode in addition to the far-field detection mode and the near-field detection mode. The noise detection mode is designed to sample a beat signal B obtained by each channel to generate sampled values of the beat signal B for each channel without transmitting the continuous-wave transmission signal Ss from the transmitting antenna 18. Hereinafter, the far-field detection mode and the near-field detection mode will be collectively referred to as a normal detection mode.

Figure 4:
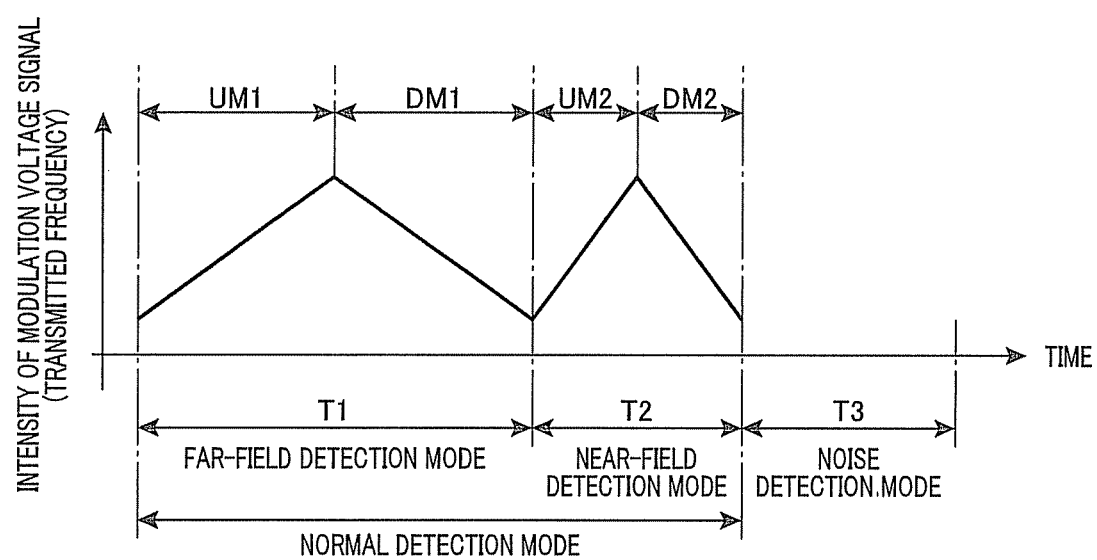
FIG. 4 is a view schematically illustrating how an operation control routine is carried out by the microcomputer according to a second embodiment of the present disclosure.
Figure 5:
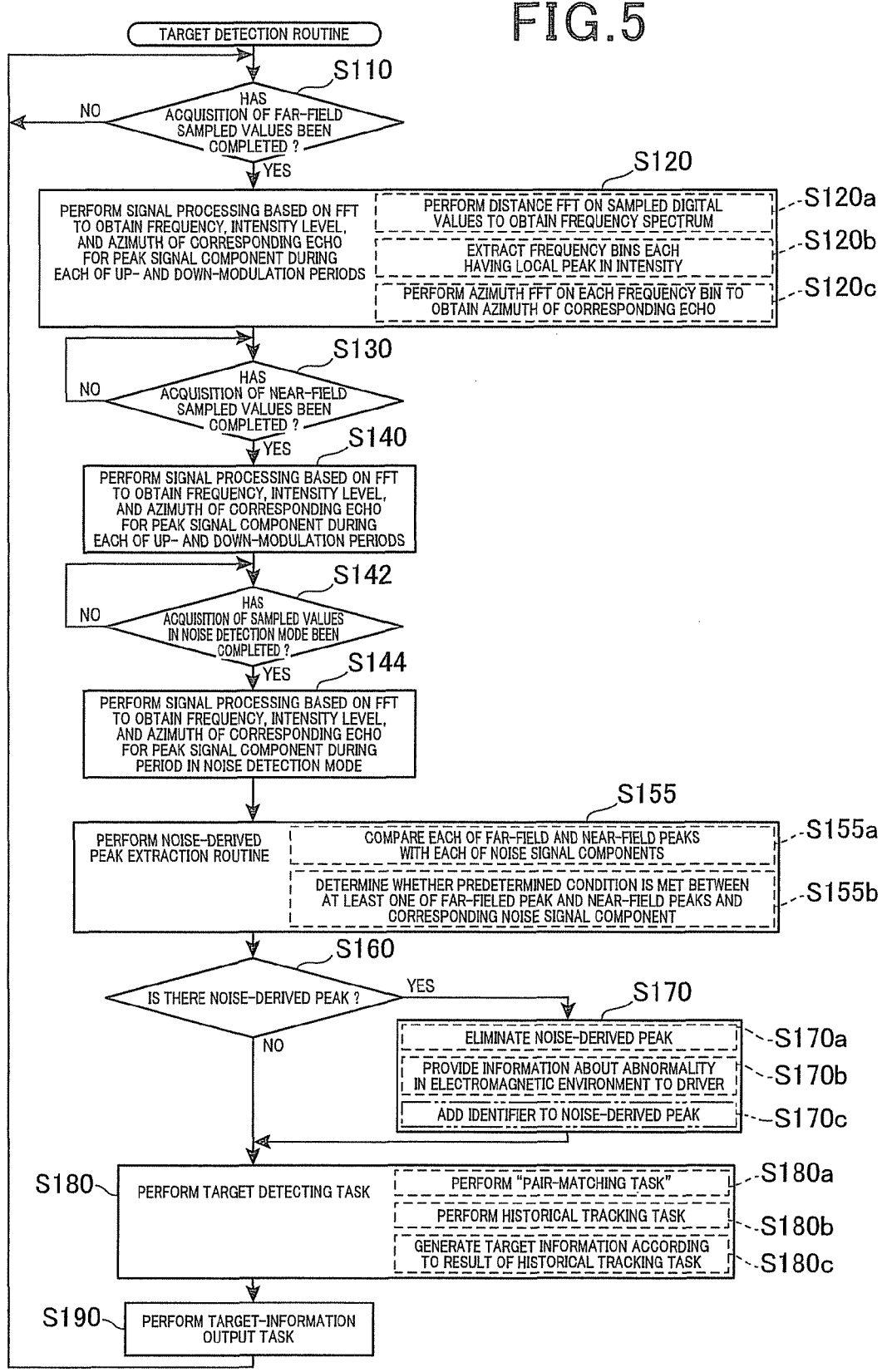
FIG. 5 is a flowchart schematically illustrating a target detection routine carried out by the microcomputer according to the second embodiment.

FIG. 4 schematically illustrates the order of execution of the detection modes, i.e. the far-field detection mode, the near-field detection mode, and the noise detection mode, during one cycle of the operation control routine, and the waveform of the triangular modulation voltage signal used for each of the respective detection modes. The waveform of the triangular modulation voltage signal used for each of the detection modes shows how the frequency of the continuous-wave transmission signal Ss from the transmitting antenna 18 for each of the detection modes is changed.

Referring to FIG. 4, the CPU 30*a* executes the operation control routine to operate the radar apparatus 2 in the order of the far-field detection mode, the near-field mode, and the noise detection mode each time the operation control routine is launched. Like the operation control mode according to the first embodiment, the reference character T1 represents the period during which the radar apparatus 2 is operating in the far-field direction mode, and the reference character T2 represents the period during which the radar apparatus 2 is operating in the near-field detection mode. In addition, reference character T3 represents a period during which the radar apparatus 2 is operating in the noise detection mode.

The order of the far-field detection mode, the near-field mode, and the noise detection mode can be changed. The sum of the period T1 in the far-field mode, the period T2 in the near-field mode, and the period T3 in the noise detection mode represents one cycle of the operation control routine of the radar apparatus 2.

In this embodiment, the period T3 is set to the time length required to obtain given Ns digital sampled values for each channel, such as for Ns=250. That is, the period T3 is expressed by the equation: T3=N×Ns×Tp.

That is, in the noise detection mode during the period T3, Ns digital sampled values D are obtained for each of the channels ch1 to chN.

Next, the target detection routine executed by the CPU 30*a* according to this embodiment will be described in detail hereinafter. The target detection routine is programmed to be launched when the radar apparatus 2 is powered up.

Figure 3:
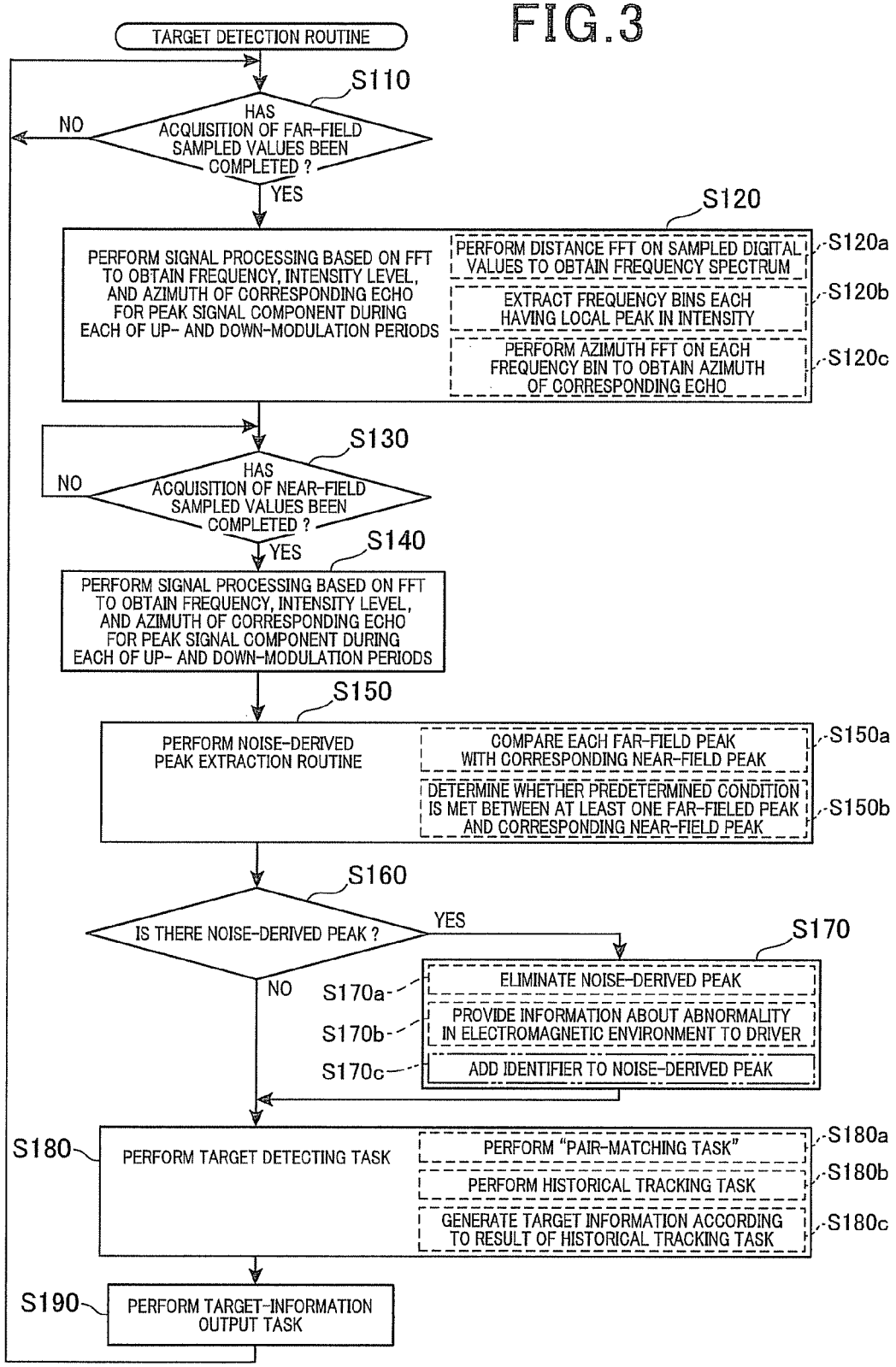
FIG. 3 is a flowchart schematically illustrating a target detection routine carried out by the microcomputer according to the first embodiment.

The target detection routine according to this embodiment is programmed such that the new operations in steps S142 to S144 are added after the operation in step S140, and the new operation in step S155 in place of the operation in step S150 is included in comparison to the target detection routine according to the first embodiment. In the target detection routines illustrated in FIGS. 3 and 5, like operations (steps) therebetween, to which like reference step numbers are assigned, are omitted or simplified to avoid redundant description.

When launched, the CPU 30*a* performs the operations in steps S110 to S140 set forth above.

After completion of the operation in step S140, the CPU 30*a* deter mines whether acquisition of Ns digital sampled values D while the radar apparatus 2 is operating in the noise detection mode has been completed in step S142. When determining that acquisition of Ns digital sampled values D has not been completed (NO in step S142), the CPU 30*a* repeats the determination in step S142.

Otherwise, when determining that acquisition of Ns digital sampled values D has been completed (YES in step S142), the CPU 30*a* carries out signal processing on the acquired Ns digital sampled values D during the period T3 in step S144.

The signal processing carried out in step S144 is substantially identical to that carried out in step S120 or S140 except wherein an FFT is performed on each of the digital sampled values of each of the beat signals B1 to BN during the period T3 to obtain a frequency spectrum, i.e. power spectrum, of each of the beat signals B1 to BN during the period T3. That is, the signal processing in step S144 obtains, for each of the peak signal components during the period T3, the frequency, the intensity level, and the arrival azimuth of at least one echo signal that produces the corresponding peak signal component. Hereinafter, the peak signal components during period T3 will be referred to as noise signal components.

After the signal processing in step S144 in the noise detection mode, the CPU 30*a* carries out a noise-derived peak extraction task in step S155. The noise-derived peak extraction task is to extract at least one peak signal component, which is estimated to be derived from a noise, in the peak signal components extracted in steps S120 and S140.

The noise-derived peak extraction task is programmed to determine whether a predetermined condition is met between each of the far-field and near-field peaks and each of the noise signal components in step S155. The predetermined condition is that the frequency, the intensity level, and the arrival azimuth of at least one echo signal of at least one of the far-field and near-field peaks are matched with those of a corresponding one of the noise signal components.

Note that, like the first embodiment, if the differences between the frequency, the intensity level, and the arrival azimuth of at least one echo signal of a far-field or near-field peak and those of a noise signal component are each within a predetermined allowable range, it is determined that the far-field or near-field peak is matched with the noise signal component.

Specifically, in step S155*a*, the CPU 30*a* compares each of the far-field and near-field peaks with each of the noise signal components. Then, the CPU 30*a* determines whether the predetermined condition is met between at least one of the far-field and near-field peaks and a corresponding at least one of the noise signal components according to the results of the comparison in step S155*b*.

When determining that the predetermined condition is not met between each of the far-field and near-field peaks and each of the noise signal components (NO in step S155*b*), the CPU 30*a* determines that there are no noise-derived peaks, i.e. peak signal components estimated to be derived from noises, in the far-field peaks and near-field peaks extracted in steps S120 and S140 (NO in step S160). Then, the CPU 30*a* carries out the operations in steps S180 and S190 in the same procedure as the first embodiment.

Otherwise, when deter that the predetermined condition is met between at least one of the far-field and near-field peaks and a corresponding one of the noise signal components (YES in step S155*b*), the CPU 30*a* determines that there is a noise-derived peak, i.e. a peak signal component estimated to be derived from a noise, in the far-field peaks and the near-field peaks extracted in steps S120 and S140 (YES in step S160). Then, the CPU 30*a* carries out the operations in steps S170 to S190 in the same procedure as the first embodiment.

As described above, the radar apparatus according to this embodiment is configured to extract noise signal components during the period T3 in the noise detection mode. Then, the radar apparatus is configured to compare each of the far-field and near-field peaks with each of the noise signal components to determine whether there are noise-derived peaks in the far-field peaks and the near-field peaks according to the results of the comparison.

Specifically, even if components of a received signal Sr are within the effective frequency range of the mixer 24, the signal components may pass through the mixer 24 with their frequencies unchanged but with their amplitudes attenuated, so that they may be superimposed on a corresponding beat signal B as noises. In addition, if components of a received signal Sr whose frequencies out of the effective frequency range of the mixer 24 are inputted to the mixer 24 together with a received signal Sr, they may pass through the mixer 24 with their frequencies unchanged but with their amplitudes attenuated, so that they may be superimposed on a corresponding beat signal B as noises.

These noises may appear as peak signal components in the averaged frequency spectrum based on the intensity levels of all the frequency components of the beat signals B1 to BN in the far-field detection mode, and, similarly, they may appear as peak signal components in the averaged frequency spectrum based on the intensity levels of all the frequency components of the beat signals B1 to BN in the near-field detection mode. The frequency of each of the peak signal components as noises in each of the far-field and near-field detection modes is identical to that of a corresponding one of the noise signal components in the noise detection mode. In addition, the other features of each of the peak signal components as noises in each of the far-field and near-field detection modes are similar to those of a corresponding one of the noise signal components in the noise detection mode.

Thus, the comparison between each of the far-field and near-field peaks with a corresponding one of the noise signal components in the noise detection mode easily makes it possible to determine whether there are noise-derived peaks in the far-field peaks and the near-field peaks.

If there are noise-derived peaks in the far-field peaks and the near-field peaks, the radar apparatus is configured to eliminate the noise-derived peaks from the far-field peaks and the near-field peaks, on which the target detecting task will be carried out. This results in an improvement of the reliability of targets detected by the radar apparatus.

Note that, in the second embodiment, the VCO 14, the transmitting antenna 18, and the receiving antenna module 20 serve as, for example, a transceiver according to the second exemplary aspect of the present disclosure. The receiving switch 22 and the mixer 24 serve as, for example, a beat signal generator according to the second exemplary aspect of the present disclosure. The microcomputer 30, particularly, its operations in steps S120 and S140 serves as, for example, a peak extractor according to the second exemplary aspect of the present disclosure. The microcomputer 30, particularly, its operation in step S180 serves as, for example, a target information generator according to the second exemplary aspect of the present disclosure. The microcomputer 30, particularly, its operations in step S155 and S160 serves as, for example, a determiner according to the second exemplary aspect of the present disclosure.

The present disclosure is not limited to the aforementioned embodiments, and therefore can be modified or deformed within its scope.

For example, in each of the first and second embodiments, the channels ch1 to chN share the single mixer 24 and the A/D converter 28, but a mixer and an A/D converter can be provided for each of the channels ch1 to chN. In each of the first and second embodiments, the single transmitting antenna 18 and the plurality of receiving antennas 21a1 to 21aN are provided to constitute the plurality of channels ch1 to chN, but the present disclosure is not limited thereto. Specifically, a plurality of transmitting antennas and a single receiving antenna can be provided to constitute the plurality of channels ch1 to chN, or a plurality of transmitting antennas and a plurality of receiving antennas can be provided to constitute the plurality of channels ch1 to chN.

In each of the first and second embodiments, the radar apparatus is configured to perform elimination of noise-derived peaks and notification of inclusion of noise-derived peaks as the noise-derived peak elimination task in step S170, but the present disclosure is not limited thereto.

Specifically, the CPU 30a can serve as an identifier setting unit. The identifier setting unit is adapted to set an identifier, such as a flag, for each of the noise-derived peaks; the identifier represents that a corresponding peak is a noise-derived peak in step S170c. In this modification, the CPU 30a can handle the noise-derived peaks to which the identifiers have been set as peak signal components with low reliability in step S180. Particularly, the CPU 30a performs the operations in steps S180a to 180c without using the noise-derived peaks.

Figure 6:
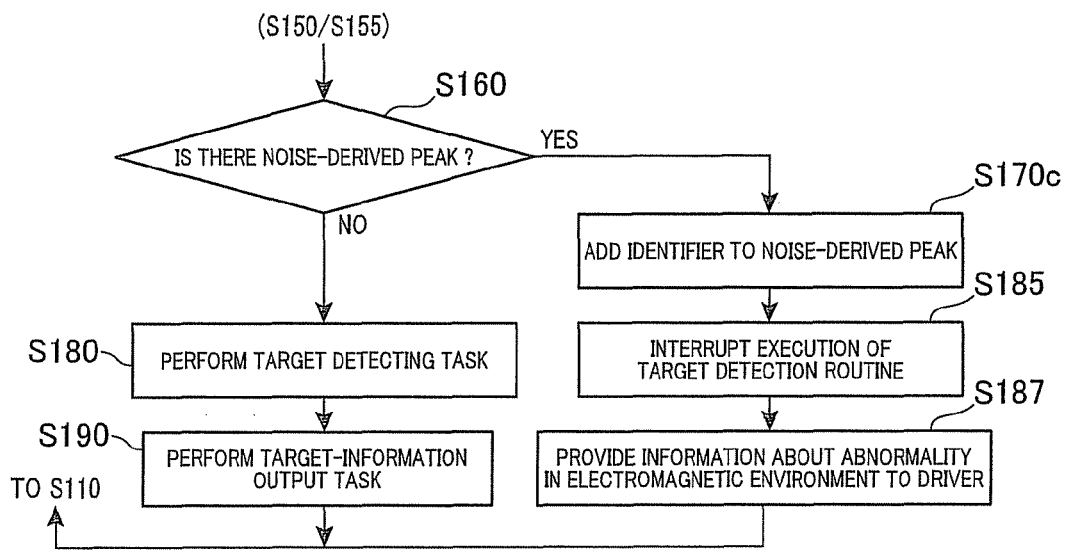
FIG. 6 is a flowchart schematically illustrating a part of a target detection routine carried out by the microcomputer according to a modification of each of the first and second embodiments.
Figure 7:
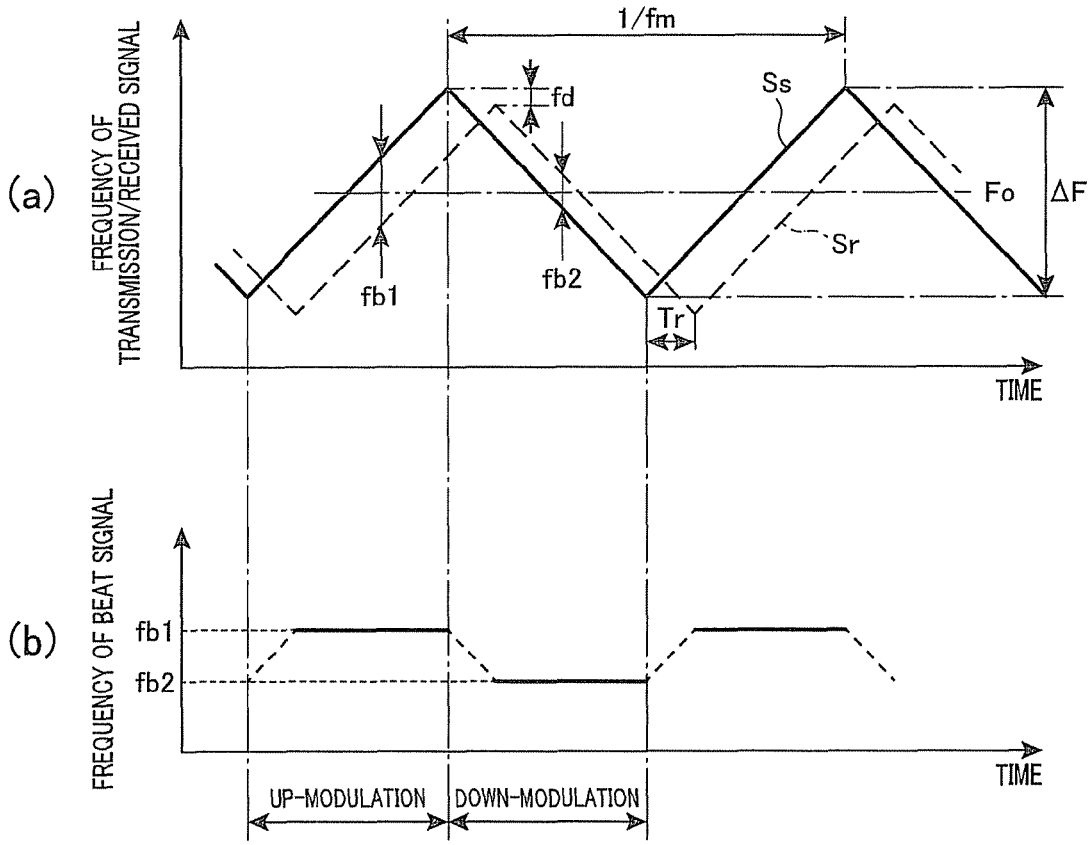
FIG. 7 is a view schematically illustrating how a typical FM-CW radar is operated.

In each of the first and second embodiments, when determining that there are noise-derived peaks in step S170, the CPU 30a continuously performs the target detection routine, but the present disclosure is not limited thereto. Specifically, in step S185 in place of step S180, the CPU 30a can serve as an interrupting unit that interrupts execution of the target detection routine in step S185, and provide information that there are some abnormalities in radio environments around the vehicle to the driver of the vehicle V via the control ECU 32 and the warning device and the monitor in step S187 (see FIG. 6). After the operation in step S187, the execution point of the CPU 30a returns to step S110, so that the CPU 30a repeatedly carries out the operations in steps S110 to S190.

In the first embodiment, the predetermined condition is that the frequency, the intensity level, and the arrival azimuth of a corresponding echo signal of at least one of the far-field peaks are matched with those of a corresponding one of the near-field peaks, respectively, but the present disclosure is not limited thereto. Specifically, the predetermined condition can be configured such that the frequency and one of the intensity level and the arrival azimuth of a corresponding echo signal of at least one of the far-field peaks are matched with those of a corresponding one of the near-field peaks, respectively. Similarly, in the second embodiment, the predetermined condition can be configured such that the frequency and one of the intensity level and the arrival azimuth of a corresponding echo signal of at least one of the far-field and near-field peaks are matched with those of a corresponding one of the noise signal components.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be constructed as non-exclusive.

What is claimed is:

1. A radar apparatus comprising:
   a transceiver operating in a first detection mode to transmit and receive a radio-wave signal having a frequency that changes at a predetermined first rate of change, and operating in a second detection mode to transmit and receive a radio-wave signal having a frequency that changes at a predetermined second rate of change, the first rate of change being different from the second rate of change;
   a beat-signal generator generating a beat signal based on the radio-wave signals transmitted and received by the transceiver;
   a peak extractor performing frequency analysis on the beat signal generated by the beat-signal generator to thereby extract, from a result of the analysis, peak signal components each having a peak in signal-intensity;
a target information generator generating, based on the peak signal components extracted by the peak extractor, information about a target that reflects the radio-wave signal; and
a noise-wave determiner determining mixing of a noise wave if there is a set of peak signal components in the peak signal components extracted by the peak extractor in the first detection mode and a peak signal component in the peak signal components extracted by the peak extractor in the second detection mode, the set of peak signal components meeting a predetermined matching condition including at least frequency matching.

2. The radar apparatus according to claim 1, wherein the matching condition includes a condition that an intensity level of one the set of peak signal components is matched with that of another one of the set of peak signal components.

3. The radar apparatus according to claim 1, wherein:
the transceiver performs at least one of transmission of the radio-wave signal and reception of the radio-wave signal using a plurality of antennas;
the peak extractor is configured to:
perform the frequency analysis for each of a plurality of channels, combinations of transmitting antennas in the plurality of antennas and receiving antennas in the plurality of antennas constituting the plurality of channels; and
obtain an arrival azimuth of a radio-wave signal for each frequency in the frequency analyses; and
the matching condition includes a condition that the arrival azimuths of radio-signal waves that generate the peak signal components are matched with each other.

4. The radar apparatus according to claim 1, further comprising:
a noise-wave eliminator eliminating the set of peak signal components meeting the predetermined matching condition from an object to be processed by the target information generator when the noise-wave determiner determines mixing of the noise wave.

5. The radar apparatus according to claim 1, further comprising:
a function stopper stopping functions of the radar apparatus when the noise-wave determiner determines mixing of the noise wave.

6. The radar apparatus according to claim 1, further comprising:
a provider providing information that there are some abnormalities in radio environments when the noise-wave determiner determines mixing of the noise wave.

7. The radar apparatus according to claim 1, wherein, when the noise-wave determiner determines mixing of the noise wave, the set of peak signal components meeting the predetermined matching condition is referred to as a set of noise-wave based peaks; and
the target information generator handles the set of noise-wave based peaks as a set of peak signal components having low reliability.

8. A radar apparatus comprising:
a transceiver operating in a normal detection mode to transmit and receive a radio-wave signal having a frequency that changes at a predetermined rate of change, and operating in a noise detection mode to only receive a radio-wave signal without transmitting a radio-wave signal;
a beat-signal generator generating a beat signal based on the radio-wave signals transmitted and received by the transceiver;
a peak extractor performing frequency analysis on the beat signal generated by the beat-signal generator to thereby extract, from a result of the analysis, peak signal components each having a peak in signal-intensity, the peak signal components extracted by the peak extractor in the noise detection mode being referred to as noise signal components;
a target information generator generating, based on the peak signal components extracted by the peak extractor, information about a target that reflects the radio-wave signal; and
a noise-wave determiner determining mixing of a noise wave if there is a set of a peak signal components in the peak signal components extracted by the peak extractor in the first detection mode and a noise signal component in the noise signal components extracted by the peak extractor in the noise detection mode, the set of the peak signal component and noise signal component meeting a predetermined matching condition including at least frequency matching.

9. The radar apparatus according to claim 8, wherein the matching condition includes a condition that an intensity level of one the set of peak signal components is matched with that of another one of the set of peak signal components.

10. The radar apparatus according to claim 8, wherein:
the transceiver performs at least one of transmission of the radio-wave signal and reception of the radio-wave signal using a plurality of antennas;
the peak extractor is configured to:
perform the frequency analysis for each of a plurality of channels, combinations of transmitting antennas in the plurality of antennas and receiving antennas in the plurality of antennas constituting the plurality of channels; and
obtain an arrival azimuth of a radio-wave signal for each frequency in the frequency analyses; and
the matching condition includes a condition that the arrival azimuths of radio-signal waves that generate the peak signal components are matched with each other.

11. The radar apparatus according to claim 8, further comprising:
a noise-wave eliminator eliminating the set of peak signal components meeting the predetermined matching condition from an object to be processed by the target information generator when the noise-wave determiner determines mixing of the noise wave.

12. The radar apparatus according to claim 8, further comprising:
a function stopper stopping functions of the radar apparatus when the noise-wave determiner determines mixing of the noise wave.

13. The radar apparatus according to claim 8, further comprising:
a provider providing information that there are some abnormalities in radio environments when the noise-wave determiner determines mixing of the noise wave.

14. The radar apparatus according to claim 8, wherein, when the noise-wave determiner determines mixing of the noise wave, the set of peak signal components meeting the predetermined matching condition is referred to as a set of noise-wave based peaks; and the target information generator handles the set of noise-wave based peaks as a set of peak signal components having low reliability.

\* \* \* \* \*